United States Patent [19]

Lunn

[11] 4,383,273
[45] May 10, 1983

[54] LARGE SCALE, SINGLE CHIP INTEGRATED CIRCUIT TELEVISION RECEIVER SUBSYSTEMS

[75] Inventor: Gerald K. Lunn, Scottsdale, Ariz.

[73] Assignee: Motorola, Inc., Schaumburg, Ill.

[21] Appl. No.: 220,607

[22] Filed: Dec. 29, 1980

[51] Int. Cl.³ .............................................. H04N 5/44
[52] U.S. Cl. .................... 358/188; 358/148; 455/333
[58] Field of Search ............... 358/188, 148, 153, 158; 455/333

[56] References Cited

U.S. PATENT DOCUMENTS 4,162,451 7/1979 Ash ..................................... 455/333
4,237,487 12/1980 Ikeda et al. ......................... 358/188

Primary Examiner—Richard Murray
Attorney, Agent, or Firm—Michael D. Bingham

[57] ABSTRACT

A single chip integrated circuit that performs the electronic functions of a monochrome television receiver with the exception of the RF tuner, sound channel, and power output stages. The circuit includes video IF/detector and video processing as well as a two loop horizontal phase locked loop for locking the horizontal flyback to the horizontal sync pulses. In addition, a vertical processing stage is related to the horizontal sync pulses, is included for producing vertical flyback. The circuit operates in a vertical narrow window mode when coincidence occurs between the vertical sync pulses and the output of a vertical countdown circuit to thereby reduce interference from noise and operates in a wide window mode when vertical sync pulses are lost or not yet acquired to allow fast acquisition of the vertical sync pulses.

10 Claims, 4 Drawing Figures

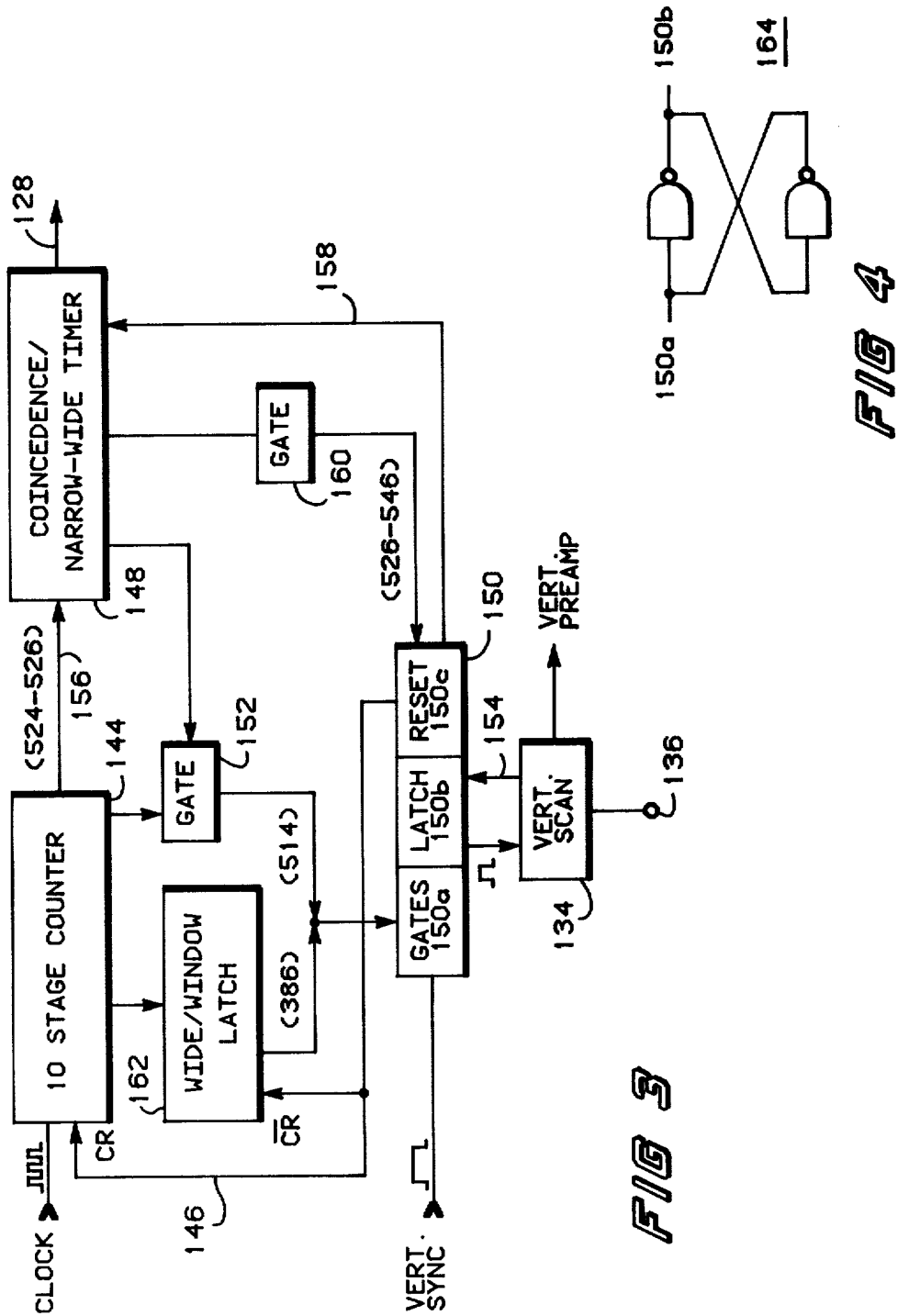

LARGE SCALE, SINGLE CHIP INTEGRATED CIRCUIT TELEVISION RECEIVER SUBSYSTEMS

CROSS REFERENCE TO RELATED APPLICATIONS

The subject matter of the present invention is related to the subject matter of the following entitled patent applications, all of which are filed concurrently herewith and assigned to the same assignee:

1. LINEAR FULL WAVE RECTIFIER CIRCUIT, Ser. No. 220,329, Gerald K. Lunn inventor.
2. CROSSOVER CIRCUIT FOR USE IN AUTOMATIC GAIN CONTROL SYSTEMS, Ser. No. 220,605, Michael McGinn inventor.
3. SYNC SEPARATOR, Ser. No. 220,611, Michael McGinn inventor.
4. INTEGRATOR CIRCUIT FOR SEPARATING VERTICAL SYNC PULSES, Ser. No. 220,614, Gerald K. Lunn inventor.
5. HORIZONTAL OSCILLATOR, Ser. No. 220,606, Michael McGinn inventor.
6. HORIZONTAL PHASE LOCK LOOP FOR TELEVISION, Ser. No. 220,608, Michael McGinn and Gerald K. Lunn.
7. HORIZONTAL PHASE DETECTOR GAIN CONTROL, Ser. No. 220,604, Michael McGinn inventor.
8. VERTICAL SYNC COUNTER HAVING MULTI MODES OF OPERATION FOR DIFFERENT TV SYSTEMS, Ser. No. 220,610, Michael McGinn inventor.

BACKGROUND OF THE INVENTION

1. Field of the Art

The present invention relates to television circuits and, more particularly, to a partitioning scheme for a television receiver for providing the video and signal processing circuits on a single large scale integrated circuit.

2. Description of the Prior Art

Since the first television receiver was built comprising discrete circuitry and vacuum tubes television receivers have evolved to the present wherein the television receiver comprises a plurality of integrated circuits in combination with the tuner and high powered portions of the circuit as well as the cathode ray tube (CRT) utilized to provide the television picture.

Generally, contemporary television receivers include a radio frequency (RF) tuner which is coupled to a tuned input of an intermediate frequency (IF) stage the output of which is coupled to both a video processing stage and a signal processing stage wherein the video composite TV signal is processed to drive the cathode ray tube with the output of the signal processing stage being utilized to drive the horizontal and vertical deflection yokes of the television cathode ray tube so that the video information supplied from the video processor is converted to a recognizable picture on the CRT.

Typically, contemporary television receivers require a minimum of four integrated circuits to provide the functions of a basic black and white television receiver. For example, the television receiver can be partitioned in a manner wherein four integrated circuits may be utilized to provide (1) video IF amplifier and video detection (2) video signal processing (3) horizontal sync information processing and (4) vertical sync information processing.

The aforedescribed combination of multiple integrated circuits results in a problem that is related to all such television receivers which is caused by undesirous signal radiation that occurs to a greater or lesser extent because of the use of external coils in tuned circuits required for detection of the composite TV stereo operating in a high signal environment. For instance, this radiation usually emanates from a portion of the television receiver where the IF signal levels are at the highest: usually at the interface of the video detector stage of the television receiver where the external tuned circuits are utilized for video detection. Another problem with television receivers utilizing multiple integrated circuits is that exact DC signal bias levels must be maintained between each one of the multiple integrated circuits. It is quite difficult to achieve these bias levels and an attempt to so requires external biasing circuitry to be utilized. Still further, the use of multiple integrated circuits can be relatively expensive when compared to a television receiver that required only a single large scale integrated chip to provide the aforementioned functions.

Hence, the present invention is concerned with combining the basic functions of a television receiver, i.e., the IF amplifier/detector stage, video processing and signal processing circuits into a single large scale integrated circuit having optimum partitioning. Such a single integrated circuit can eliminate radiation problems as aforedescribed with elimination of tuned circuits by the use thereof as well as save costs by eliminating the need for multiple integrated circuits.

SUMMARY OF THE INVENTION

Accordingly, it is an object of the present invention to provide a large scale integrated circuit television subsystem.

There's another object of the present invention to provide a large scale integrated circuit incorporating the basic functions of a television receiver including the IF amplifier, video detecting and processing, horizontal and vertical processing circuits therefor.

A still further object of the present invention is to provide a large scale integrated circuit to be utilized in a television receiver having a horizontal and vertical processing circuit for producing vertical and horizontal sync pulses which are related to each other.

In accordance with the above and other objects there is provided a large scale integrated circuit having circuit partitioning for providing basic functions of a black and white television receiver including an IF amplifier section, a video detector, a signal processor, a video signal processor, horizontal and vertical processors therein.

One feature of the present invention is that the video detector circuit eliminates the use of tuned circuits such that radiation problems which frequently occur in prior art television receivers are eliminated or at least greatly reduced.

BRIEF DESCRIPTION OF THE DRAWINGS

FIG. 3 is a block diagram of a vertical countdown circuitry of the present invention; and FIG. 4 is a schematic diagram of a latch circuit utilized in the vertical countdown circuitry of FIG. 3.

DETAILED DESCRIPTION OF THE INVENTION

Figure 1:
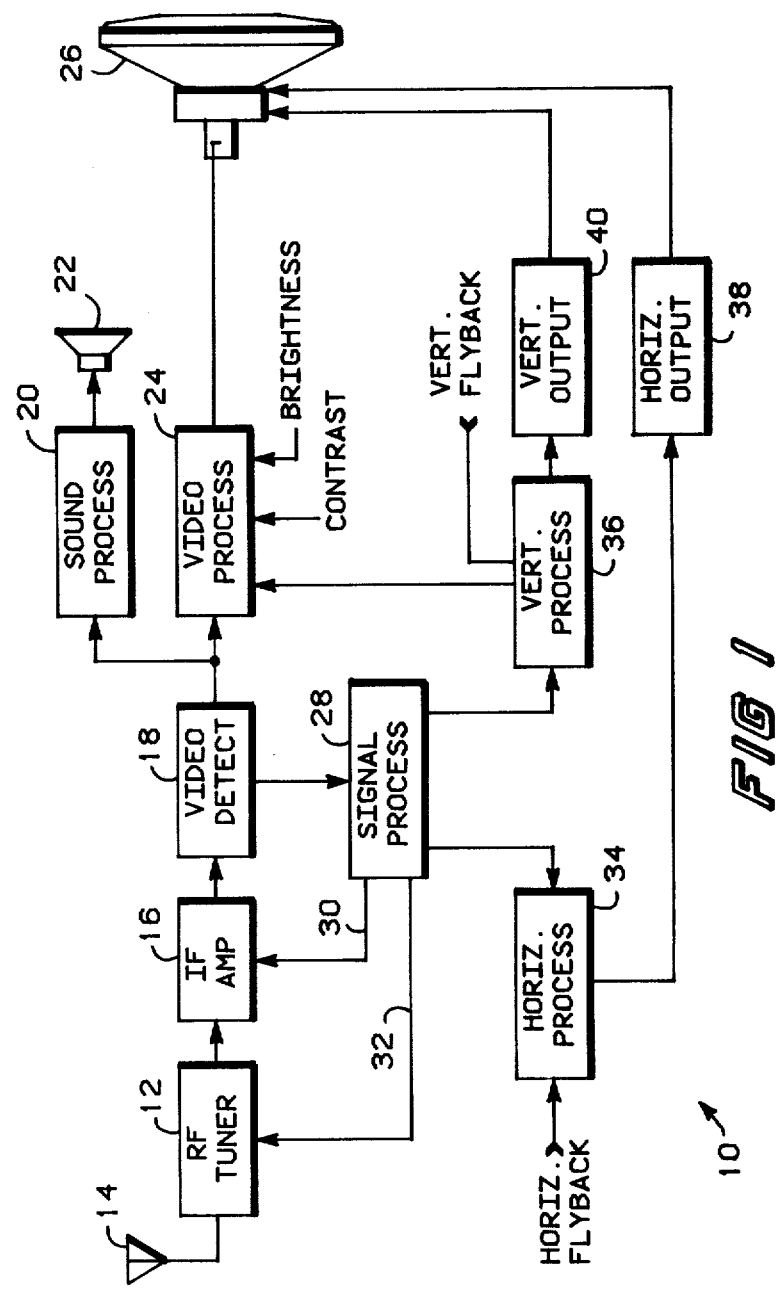
FIG. 1 is a block diagram illustrating a typical black and white television receiver.

Turning to FIG. 1, there is shown a typical black and white television receiver which is generally understood to those skilled in the art. Television receiver (10), as shown, comprises a RF tuner section 12 which is coupled to antenna 14 to receive the television composite signal. RF tuner 12 includes a voltage controlled oscillator for converting the composite television signal to an IF frequency which is then applied via a tuned stage to the input of IF amplifier section 16. The output of IF amplifier section 16 is applied to video detector 18 wherein the video information, as well as the vertical and horizontal sync information are detected and separated from the sound information carrying signal. The sound signal is processed through sound processing circuit 20 to be reproduced as audio at speaker 22. The video information is processed through video processing circuit 24 to drive the cathode of cathode ray tube 26 to develop the television picture in conjunction with the vertical and horizontal deflection circuits V and H which surround tube 26. An output is also supplied from video detector 18 to signal processing circuit 28, which as known provides several functional outputs, i.e., gated automatic gain control signals are provided for controlling the gains of the IF amplifier stage 16 and the RF tuner 12 via leads 30 and 32 respectively, also, the horizontal and vertical sync pulses are separated with RF noise spikes eliminated from the sync pulses. The respective pulses are supplied to horizontal and vertical processing circuits 34 and 36. Video processing circuit 24 is shown as receiving contrast and brightness control signals as is understood to vary the signal drive to the cathode of cathode ray tube 26. Video processing circuit 24 also receives a blanking signal from vertical processing circuit 36 to blank the screen of the tube 26 during the vertical flyback period of the television receiver.

Horizontal and vertical processing circuits 34 and 36 each typically include a free running oscillator which may be locked by the respective horizontal and vertical sync pulses supplied thereto for synching the horizontal and vertical scanning to the received video signal. Horizontal scanning information is sampled from the currents introduced through the horizontal deflection coils, H and V, which are positioned about tube 26 in order to maintain synchronization and linearity of drive. The outputs from horizontal and vertical circuits 34 and 36 are supplied to horizontal and vertical output amplifiers 38 and 40 respectively to drive the aforementioned deflection coils.

It should be understood that although the foregoing description refers to a black and white television receiver that those skilled in the art understand that a color receiver is also explained in that only a chroma demodulator and driver stages need be added to the television received in a known manner in conjunction with a color cathode ray tube.

Typically, television receiver 10 comprises a minimum of four integrated circuits (IC's) for providing the IF, video detection, horizontal sync and vertical sync processing. As an example, television receiver 10 can be realized using the following available ICs which are manufactured by Motorola Inc.:

| TELEVISION CIRCUIT | IC |
| --- | --- |
| IF Amplifier 16 | MC1349/1350 |
| Video Detector and Video Processing Circuits 18 and 24 | MC1330/1350 |
| Sound Processing Circuit 20 | TDA1190 |
| Signal Processing Circuit 28 | MC1344 |
| Horizontal Processing Circuit 34 | MC1391 |
| Vertical Processing Circuit 36 | MC1393 |

As mentioned previously, prior art television receivers of the type described above suffer from several disadvantages, i.e. radiation problems and maintenance of accurate dc levels between individual integrated circuits. The present invention relates to specific partitioning of the several individual stages described above into a large scale integrated circuit to eliminate radiation problems generally arising in the video detector portion by eliminating the need for tuned circuits as well as eliminating the need for several dc biasing circuits for maintaining the dc levels between the individual integrated circuits.

Figure 2:
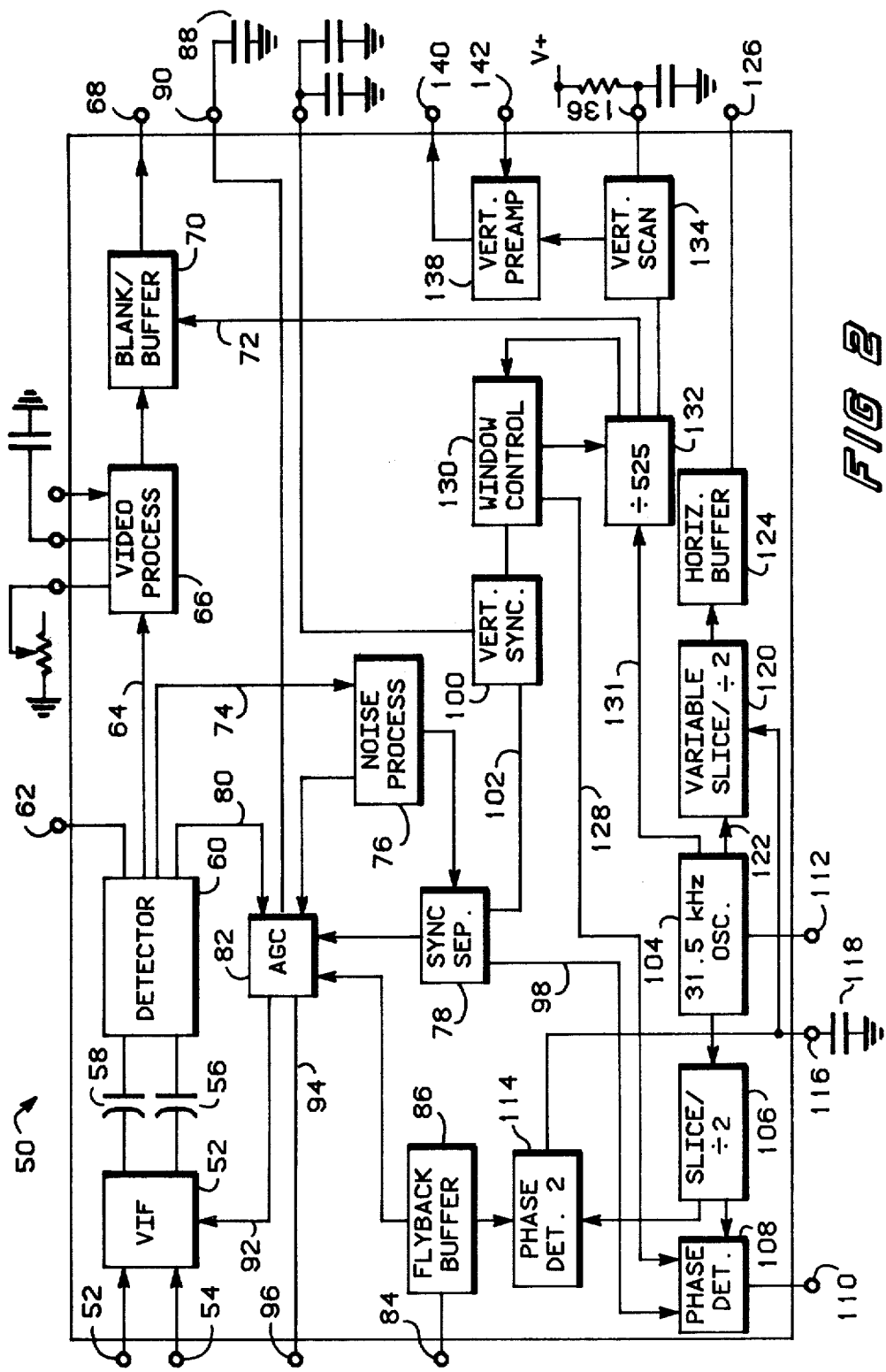
FIG. 2 is a block diagram of the television receiver of the present invention.

Turning now to FIG. 2, there is shown a large scale integrated television receiver subsystem circuit 50 of the preferred embodiment wherein partitioning of the IF and video processing circuitry is accomplished on one single integrated circuit to eliminate the aforementioned problems of the prior art. As illustrated single integrated circuit television receiver subsystem 50 includes video IF amplifier stage 52 to which is supplied the composite television signal at input terminals 52 and 54 from a RF tuner section (not shown). The output of the video IF section is coupled via coupling capacitors 56 and 58 to the input of video detector 60. Coupling capacitors 58 and 56 are integrated on the integrated circuit whereby video detector 60 is ac coupled to video IF amplifier 52. The output at output terminal 62 from video detector is supplied to the sound processor section of the television receiver which is not part of the integrated circuit subsystem 50. Copending patent application, Ser. No. 220,329, entitled "Linear Full Wave Rectifier Circuit" which is incorporated herein by reference describes a circuit that may be utilized for detecting the video television composite signal. The composite video information signal appearing at the output of video detector 60 is supplied via lead 64 to video processor circuit 66 and is processed in like manner for prior art processor circuits to provide the luma information to the cathode of the cathode ray tube at output 68 of subsystem circuit 50. It is to be understood that if a color television receiver is to utilize single subsystem circuit 50 that chroma demodulator and detector circuits would be coupled to output terminal 68 to provide chroma information to a color tube. The output of video processing circuit 66 is coupled to output 68 through a blank/buffer circuit 70 which receives a blanking input signal via lead 72 to provide the blanking function to the television tube during vertical flyback. Still another output of detector 60 is taken via lead 74 and supplied to noise processing circuit 76 for eliminating noise spikes from the composite video signal appearing at output 74. Noise processing circuit 76 provides the aforementioned function in a known manner wherein the noise spikes are inverted and then added back to the signal for example, to eliminate the same therefrom so that noise spikes will not affect the operation of the sync separator circuit 78. The output of noise processor circuit 76 as well as sync separator 78 and output 80 of video detector 60 is supplied to automatic gain control (AGC) circuit 82. The horizontal flyback signal supplied at input terminal 84 via buffer circuit 86 is also supplied to an input of AGC circuit 82 to develop a gated gain control signal at the outputs of thereof in response to a gain control voltage being developed across an external capacitor 88 supplied to input terminal 90 of the television receiver subsystem 50. AGC circuit 82 operates in a known manner to first vary the gain of the video IF section 52 via lead 92 and then to vary the gain of the RF tuner via lead 94 which is connected at an output pin 96 of television receiver subsystem 50. A more detailed description of the operation of an AGC circuit which may be utilized in the subsystem is given in copending patent application, Ser. No. 220,605, entitled "Crossover Circuit For Use in Automatic Gain Control Systems" which is incorporated herein by reference.

The output of noise processor circuit 76 is supplied to sync separator 78 to separate the horizontal and vertical sync pulses from the video composite signal as is well known in the art. A possible circuit which may be utilized as sync separator 78 is described in detail in referenced patent application, Ser. No. 220,611, entitled "Sync Separator" which is also incorporated herein by reference. The horizontal sync pulses from sync separator 78 or supplied to a horizontal processor circuit via lead 98 with the vertical sync pulse information being supplied to vertical sync circuit 100 via lead 102. Vertical sync circuit 100 may include an integrator circuit described in copending patent application, Ser. No. 220,614, entitled "Integrator Circuit For Separating Vertical Sync Pulses," which is incorporated herein by reference.

As illustrated, the horizontal processor portion of television receiver subsystem circuit 50 operates to lock the horizontal flyback signal to the horizontal sync pulse which is in turn locked to the horizontal oscillator 104. An oscillator suitable for use as horizontal oscillator 104 is described in copending patent application, Ser. No. 220,606, entitled "Horizontal Oscillator," and incorporated herein by reference operates at a frequency equal to twice the horizontal line frequency, i.e., 31.5 kHz. In the present embodiment, the horizontal processing circuit besides including horizontal oscillator 104, comprises a phase lock loop circuit comprising two loops. The first loop includes oscillator 104 which is a free running oscillator line the output thereof being provided to a slicer and divide by two circuit 106. The output of slicer circuit 106 is provided to a first phase detector 108 which is gated by the horizontal sync pulses provided from sync separator 78 via lead 98. The output of phase detector 108 is provided at an output 110 to a low pass filter (not shown) and is returned to the input of the horizontal oscillator 104 at an input pin 112. In this manner, the frequency of the horizontal oscillator 104 is varied such that the horizontal sync pulses are centered about the trailing edges of the output pulses of the horizontal oscillator 104. The second loop of the two-loop horizontal phase lock loop circuit includes oscillator 104, slicer/divide by two circuit 106, and a second phase detector 114 which is gated by the flyback pulses from the horizontal deflection circuit of the television receiver and supplied at input terminal 84 through flyback buffer 86. The output of phase detector 114 is supplied at an output 116 to a low pass filter which may be, as shown, capacitor 118 to bias a variable slicer/divide by two circuit 120 which also receives the horizontal oscillator pulses via lead 122. In this manner, the horizontal flyback pulse is centered about a point on the output of the oscillator such that the horizontal flyback pulses are locked with respect to the horizontal sync pulses to the horizontal oscillator. A detailed description of a horizontal processor circuit that may be utilized in the present invention is provided in aforereferenced copending patent application, Ser. No. 220,608, entitled "Horizontal Phase Lock Loop For Television" which is incorporated herein by reference. The output of variable slicer 120 supplied through a horizontal buffer circuit 124 to output pin 126. As understood, the output from the horizontal processor circuit, at output pin 126, is supplied to a horizontal driver amplifier to drive the horizontal deflection coils of the cathode ray tube of the television receiver. Phase detector 108 is shown as also receiving an input control signal via lead 128 from a window control circuit 130. As is fully explained in copending patent application, Ser. No. 220,604, entitled "Horizontal Phase Detector Gain Control", and incorporated herein by reference, the gain of the phase detector 108 is varied by this control signal supplied from window control circuit 130 in accordance with the television receiver being either in sync or not with the television composite signal. Hence, if the television receiver is in sync the gain of phase detector 108 is at a nominal value and is then increased if the television is not in sync to the incoming composite television signal, this increases the bandwidth of the phased locked loop to effect a faster pull-in of the horizontal sync pulses as is understood. An output of horizontal oscillator 104 is taken via lead 131 and is supplied to a vertical countdown circuit 132. Vertical sync pulses are also supplied to the vertical processor circuit from vertical sync circuit 100. As will be fully explained hereinafter, the vertical sync pulses are utilized to reset vertical countdown circuit 132, a divide by 525 counter, such that in response to the input pulses supplied from the horizontal oscillator 104, a vertical flyback pulse is derived once each frame, as is required to sync the vertical picture scanning to the received video signal. Vertical countdown circuit 132 also supplies the aforementioned blanking signal via lead 72 to blanking buffer 70. The output of the vertical countdown circuit 132 is provided to vertical scan circuit 134. The output of vertical countdown circuit 132 is essentially the vertical sync pulse which is then utilized to generate a ramp signal across the RC combination connected at pin 136 to derive the vertical flyback pulse via vertical preamplifier 138 to the vertical deflection coils of the tube at output 140. A feedback signal generated through the vertical deflection coils of the tube is supplied at input pin 142 to an input of vertical preamp 138 to insure tracking of the vertical flyback pulse.

Turning to FIGS. 3 and 4, the combined operation of vertical countdown circuit 32 and window control circuit 130 can be explained. Window control circuit 130 is fully discussed in the aforereferenced application, "Horizontal Phase Detector Gain Control" application with respect to generating a gain control signal for varying the gain of phase detector 108 when the television receiver incorporating the present invention is out of sync. Additionally a detailed explanation of countdown circuit 132 is provided in copending patent application, Ser. No. 220,610, entitled "Vertical Sync Counter Having Multi Modes of Operation For Different TV Systems." Both of the foregoing patent applications are incorporated herein by reference. Briefly, the output pulses of horizontal oscillator 104 are supplied to the input of countdown circuit 132 to initiate vertical countdown. Vertical countdown circuit 132 comprises a ten stage counter 144 as understood. The horizontal oscillator clock pulses are divided by 525 by the counter to provide a decode signal once each frame of the television picture to coincide with the vertical sync pulse supplied from vertical sync circuit 100. Vertical countdown circuit 132 includes a reset circuit 150 for among other things providing a reset pulse via lead 146 to reset counter 144 on the occurrence of a vertical sync pulse.

In normal operation, with the television receiver in sync, the vertical sync pulse is supplied to a plurality of serially connected logic gate inverters 150a at the input of reset circuit 150. These gates may be enabled at the 514th count of counter 144 by gate 152 to allow the sync pulse to pass to latch portion 150b of reset circuit 150. The latch portion provides an output both at the input of reset portion 150c of reset circuit 150 and to the input of vertical scan circuit 134 to initiate the vertical flyback period as previously discussed. The structure of the latch circuit is shown in FIG. 4 and includes a pair of integrated injection logic (I$^2$L) NAND gates as shown. At a predetermined level of the ramp signal generated at terminal 136 a stop signal is initiated from vertical scan circuit 134 via lead 154 to put latch portion 150b in its latched state to thereby inhibit the input to vertical scan circuit 134 as well as to reset reset portion 150c. Therefore, in addition to initiating the vertical flyback period, the horizontal sync pulse produces a reset signal to reset counter 144. The reset portion of reset circuit 150 may be a D-type flip flop circuit.

Between the 524th and 526th counts of the counter a narrow window pulse is produced via output lead 156 to the input of coincidence detector 148 of window control circuit 130. If coincidence occurs during this narrow window with the reset signals applied via lead 158, coincidence detector 148 maintains the nominal gain of phase detector 108 and gate 152 is enabled to in turn enable the gates of circuit 150. Thus, a narrow window is established between counts 514 to 526 within which coincidence of the vertical sync pulse must occur. If vertical sync is lost for one reason or another such that a vertical sync pulse does not occur during this narrow window pulse, counter 144 provides a decode signal at count 526 through "OR" gate 160 to produce a reset pulse to the counter. However, after eight missing sync pulses window control circuit 130 defaults to a wide window mode to vary the gain of phase detector 108 as well as to open the period that the gates of reset circuit 150 are enabled. In this wide window mode, gate 152 is disabled by coincidence detector 148 which therefore enables wide window latch 162 to enable the gates of reset counter 150 at the 86th count from counter 144. Simultaneously, gate 160 is enabled to provide a decode signal at the 546th count. Thus, a wide window pulse is initiated to occur between the 86th and 546th count. As soon as a vertical sync pulse is acquired during the wide window mode, window control circuit 130 reverts back to the narrow window mode of operation. Hence, during normal operating conditions a narrow window mode of operation is established in television subsystem 50 to inhibit noise interfering with vertical synchronization of the television receiver with a wide window mode being defaulted to when vertical sync pulses are lost for one reason or another to thereby allow fast acquisition thereof.

Thus, what has been described is a single chip integrated circuit that will perform the electronic functions of a monochrome television receiver with the exception of the tuner, sound channel and power output stages. It is to be understood that the aforedescribed single chip integrated circuit can be utilized in conjunction with a chroma demodulator detector stage to provide a color television receiver.

I claim:

1. A television subsystem for performing all of the electronic video processing functions of a television receiver required between the RF tuner and the power output stages of the receiver but for the sound channel, including means for producing horizontal and vertical sync pulses wherein the subsystem is a single integrated circuit.

2. A television subsystem for performing all of the electronic video processing functions of a television receiver required between the RF tuner and the power output stages of the receiver but for the sound channel wherein the subsystem is a single integrated circuit chip, including:

a video amplifier coupled to inputs of the chip for receiving the composite television signal supplied from the RF tuner;

a video detector and video processor for providing luma information at a first output of the chip;

a single processor coupled to an output of said video detector for providing a gain control signal, horizontal and vertical sync signals at respective outputs;

a gated automatic gain control circuit responsive to said gain control signal from said signal processor and both horizontal sync and horizontal flyback signals for providing gain control of said video amplifier;

a horizontal processor circuit coupled to said signal processor and including a two-loop phase locked loop for locking said horizontal flyback signal in relation to said horizontal sync pulses to produce horizontal deflection output signals at a second output of the subsystem; and a vertical processor circuit which receives an input from said horizontal processor circuit which occurs at a frequency twice the frequency of the horizontal flyback signal and a vertical sync pulse for producing vertical deflection output signals at a third output of the subsystem.

3. A single chip television subsystem integrated circuit for a television receiver, comprising:

a video IF amplifier coupled to inputs of the subsystem for receiving a television composite signal supplied from a RF tuner;

a video detector and video signal processor circuit coupled to the output of said video IF amplifier for providing luma information signals at a first output of the subsystem;

a signal processor circuit for developing both horizontal and vertical sync pulses, said signal processor circuit being coupled to the output of said video detector;

a horizontal signal processor circuit responsive to said horizontal sync pulses and horizontal flyback signals supplied thereto from the horizontal deflection circuitry of the television receiver for producing horizontal deflection output signals at a horizontal line frequency at a second output of the subsystem; and a vertical signal processor circuit responsive both to said vertical sync pulses and a clocking signal supplied from said horizontal signal processor circuit for producing vertical deflection output signals at a third output of the subsystem.

4. The subsystem of claim 3 wherein:

said clocking signals supplied to said vertical processor circuit from said horizontal processor circuit occur at twice the horizontal line frequency; and said horizontal processor circuit includes a two loop phase locked loop such that said horizontal flyback signals are locked in relation to said horizontal sync pulses with said phase locked loop including a free running oscillator operating at twice said horizontal line frequency, said frequency thereof being varied such that the output from said oscillator occurs in relation to said horizontal sync pulses.

5. The subsystem of claim 4 wherein said vertical processor includes:

a window control circuit; and a countdown circuit coupled with said window control circuit for receiving said vertical sync pulses and said clocking signals such that the subsystem operates in a vertical narrow window mode when coincidence occurs between said vertical sync pulses and a reset window pulse produced by said countdown circuit, the subsystem operating in a wide window mode in the absence of said coincidence until such time said coincidence is reestablished, the gain of one of said two loops of said horizontal phase locked loop being varied in accordance with each mode of operation.

6. In a television receiver including a RF tuner, sound channel, power output driver stages for driving a cathode ray tube, the improvement comprising the partitioning of a subsystem of the receiver wherein a single chip integrated circuit is provided to produce the video electronic functions of the television receiver required between the RF tuner and power output driver stages thereof including processing means for producing horizontal and vertical sync pulses.

7. In a television receiver including a RF tuner, sound channel, power output stages for driving a cathode ray tube, the improvement comprising the partitioning of a subsystem of the receiver wherein a single chip integrated circuit is provided to produce the video electronic functions of the television receiver required between the RF tuner and the power output driver stages, the subsystem including:

a video IF amplifier coupled to inputs of the chip for receiving the output from the RF tuner;

a video detector and video signal processor coupled to an output of said IF amplifier for providing luma signal information to the tube at a first output of the chip;

a signal processor for providing horizontal and vertical sync pulses at respective outputs, said signal processor being coupled to an output of said video detector;

a horizontal processor responsive to said horizontal sync pulses and to generated horizontal flyback signals supplied thereto from the horizontal deflection circuit of the television receiver to phase lock said horizontal flyback signals to said horizontal sync pulses for providing horizontal deflection signals to said horizontal deflection circuit at a second output of the subsystem; and a vertical processor receiving said vertical sync pulses and input control signals from said horizontal processor which operates in a first or a second mode depending on said vertical sync pulses occurring in coincidence with a coincidence signal generated from said input control signals for providing vertical deflection signals to vertical deflection circuit for the television receiver to provide vertical flyback periods.

8. A monolithic integrated circuit for use in a television receiver to perform all of the video processing functions of the television receiver including a video detector circuit wherein video signal information is detected and separated from a composite television signal supplied to the television receiver without requiring an external tuned circuit coupled to said video detector circuit.

9. A monolithic integrated circuit for use in a television receiver to perform all of the video processing function of the television receiver between the RF tuner and the power output stages of the receiver, said circuit comprising a video detector circuit for detecting the composite video information signal, said video detector circuit being formed totally within the integrated circuit.

10. In a television receiver, an integrated circuit for performing the electronic video processing functions of the television receiver, said integrated circuit including a video detector circuit formed in the integrated circuit for detecting the video composite signal, said video detector circuit requiring no external tuned tank circuit to be coupled therewith.

* * * * *